(No Model.)
E. G. HASTINGS.
MUSIC LEAF TURNER.
No. 310,199. Patented Jan. 6, 1885.
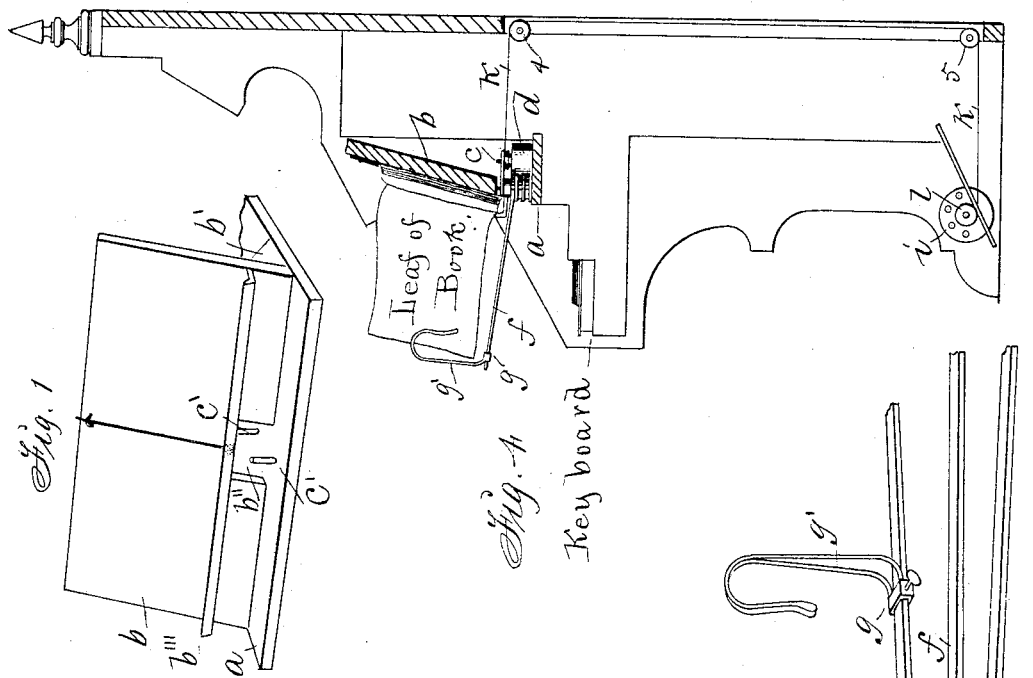
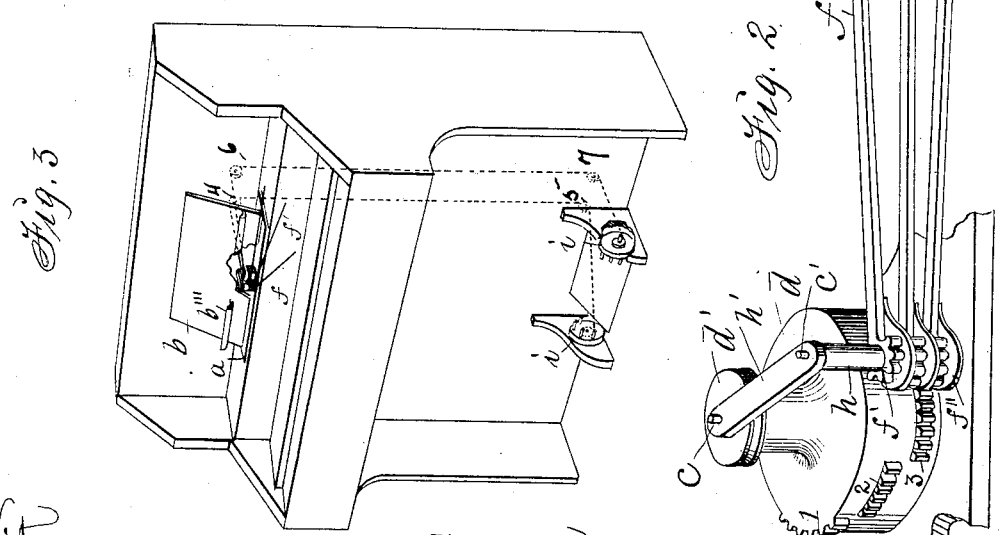
Witnesses:
Orra C. Moore
W. T. Anderson
Inventor:
Edwin G. Hastings
By Thomas G. Orwig, Attorney

UNITED STATES PATENT OFFICE.

EDWIN G. HASTINGS, OF NEVADA, IOWA.

MUSIC-LEAF TURNER.

SPECIFICATION forming part of Letters Patent No. 310,199, dated January 6, 1885.

Application filed December 17, 1883. (No model.)

*To all whom it may concern:*

Be it known that I, EDWIN G. HASTINGS, of Nevada, in Story county, and State of Iowa, have invented a Music-Leaf Turner, of which the following is a specification.

My object is to provide a practical mechanical device and attachment for organs and pianos to turn the leaves of a music-book by the foot-pressure of the operator, so that he will need no assistant to turn leaves, and will not be required to remove his hands from the keyboard, and have no interruptions and pauses in the performance of a piece of music, such as are frequently occasioned by using the hands in turning leaves while playing.

My invention consists in the construction and combination of a book-rest, a spool having toothed sectors, arms having toothed sectors, adjustable leaf-clasping devices, a cord, and cord-directing-pulleys, as hereinafter fully set forth.

Figure 1 of my accompanying drawings is a perspective view of my book-rest and base for my operating mechanism. Fig. 2 is an enlarged perspective view of the spool and two arms, having toothed sectors, and an adjustable leaf-clasping device attached to one of the arms. Fig. 3 is a perspective view of an organ having my complete device attached. Fig. 4 is a transverse section.

Jointly considered, these figures clearly illustrate the construction, application, and operation of my device.

$a$ is the base-piece of my book-rest, in the form of a straight strip of wood.

$b$ is a board of corresponding length fixed on top of the piece $a$, to project upward at any angle desired.

$b'$ are triangular-shaped pieces fixed in the angle formed by the two pieces $a$ and $b$, for the purpose of uniting them securely and rigidly.

$b''$ is an opening formed in the bottom and center of the board $b$.

$b'''$ are brackets fixed to the front face of the board $b$, to support a hook.

$c$ is a pin or post fixed in the base-piece $a$, to support the spool having toothed sectors.

$c'$ is a similar post, upon which series of arms having toothed sectors are placed and operated.

$d$ is a spool, that has a series of toothed sectors, 1 2 3, on its periphery at different points of elevation.

$d'$ is a cord-pulley fixed to the top of the spool.

$ff$ represent a series of arms having perforated toothed sectors $f'$ on their ends, adapting them to be pivoted to the book-rest by placing the sectors upon the post $c'$.

$f''$ are flanges on the lower sides of the sectors $f'$, to keep the arms separated, and to extend under and between the toothed sectors on the spool $d$ as it revolves.

$g$ is a sliding loop secured to one of the arms $f$ by means of a set-screw.

$g'$ are curved wires fixed to the loop $g$, to extend upward to clasp the leaf of a music-book.

$h$ represents a washer placed upon the post $c'$ and top of the sectors and arms $ff'$.

$h'$ is a brace connecting the top ends of the posts $c$ and $c'$.

$i\ i$ are pin-wheels journaled to the pedal-frame of an organ or piano, or to brackets contiguous thereto. Pins projecting from their sides are adapted to be pressed by the operator's feet, and thereby turned to wind the ends of a cord, $k$, upon pulleys $l$, fixed to the axes of the wheels $i$.

4 5 6 7 are pulleys, over which the cord $k$ is directed from the pin-wheel $i$ to the pulley $d'$ on top of the spool $d$. The bearings of these cord-directing pulleys are attached to the organ or piano in any suitable way, so that the pulleys and cord will not interfere with the operative mechanism of the instrument.

In the practical operation of my invention thus constructed and applied, I simply place an open music-book upon the book-rest, turn all the arms to the left, and connect the leaf-clasping devices carried by the arms with the leaves that are to be successively turned. To turn a leaf from left to right at the proper moment, I simply press the pin-wheel on the right of my feet so that it will make a partial revolution, and in so doing wind the end of the cord upon the pulley on the end of the axle of the crank-wheel, and thereby rotate the spool having toothed sectors. The uppermost arm, having its toothed sector engaged with the corresponding sector of the spool, will be swung from left to right by the rotary motion and fractional revolution of the spool, and, by means of the leaf-clasping device, carry and turn the leaf from left to right. Each leaf to be turned can thus be instantly moved by foot-pressure, while the fingers and hands remain upon the key-board. To turn back the leaves from right to left, reverse motions are imparted to the arms successively by simply pressing the left crank-wheel and winding the opposite end of the cord upon the pulley on its axle.

I claim as my invention—

The book-rest $a\ b\ b''\ b''$, having fixed posts $c\ c'$, the spool $d$, having a series of toothed sectors, 1 2 3, and a pulley, $d'$, a series of arms, $f$, having toothed sectors on their ends and carrying leaf-clasping devices, pin-wheels $i\ i$, having pulleys $l$, a cord, $k$, and cord-directing pulleys 4 5 6 7, arranged and combined relative to each other, and an organ or piano, in the manner set forth, for the purposes specified.

EDWIN G. HASTINGS.

Witnesses:
R. H. COOPER,
H. M. FENISON.